(12) United States Patent
Liversage et al.

(10) Patent No.: US 9,255,312 B2
(45) Date of Patent: Feb. 9, 2016

(54) CUTTING TOOL INSERT

(76) Inventors: John Hewitt Liversage, Springs (SA);
Iain Patrick Goudemond, Springs (SA); Danny Eugene Scott, Montgomery, TX (US)

(*) Notice: Subject to any disclaimer, the term of this patent is extended or adjusted under 35 U.S.C. 154(b) by 735 days.

(21) Appl. No.: 12/668,308

(22) PCT Filed: Apr. 8, 2009

(86) PCT No.: PCT/IB2009/051479
§ 371 (c)(1),
(2), (4) Date: Mar. 26, 2010

(87) PCT Pub. No.: WO2009/125355
PCT Pub. Date: Oct. 15, 2009

(65) Prior Publication Data
US 2010/0196717 A1     Aug. 5, 2010

(30) Foreign Application Priority Data

Apr. 8, 2008   (ZA) ................. 2008/03078

(51) Int. Cl.
*B32B 9/00* (2006.01)
*B29C 65/02* (2006.01)
*C22C 26/00* (2006.01)
*B01J 3/06* (2006.01)
(Continued)

(52) U.S. Cl.
CPC ................. *C22C 26/00* (2013.01); *B01J 3/065* (2013.01); *B22F 7/062* (2013.01); *C04B 35/52* (2013.01); *C04B 35/573* (2013.01); *C04B 35/645* (2013.01); *C04B 37/021* (2013.01); *C04B 37/026* (2013.01); *B01J 2203/0655* (2013.01); *C04B 2235/427* (2013.01); *C04B 2237/122* (2013.01); *C04B 2237/123* (2013.01); *C04B 2237/363* (2013.01); *C04B 2237/365* (2013.01); *C04B 2237/704* (2013.01); *C22C 2204/00* (2013.01); *Y10T 156/10* (2015.01); *Y10T 428/30* (2015.01)

(58) Field of Classification Search
CPC ... B01J 2203/0655; B01J 3/065; B22F 7/062; C04B 2235/427; C04B 2237/122; C04B 2237/123; C04B 2237/363; C04B 2237/365; C04B 2237/704; C04B 35/52; C04B 35/573; C04B 35/645; C04B 37/021
USPC .......................................................... 51/293
See application file for complete search history.

(56) References Cited

U.S. PATENT DOCUMENTS 4,224,380 A   9/1980   Bovenkerk et al.
4,766,040 A   8/1988   Hillert et al.
(Continued)

FOREIGN PATENT DOCUMENTS

EP   0 054 846 A   6/1982
EP   0 214 795 A   3/1987
(Continued)

*Primary Examiner* — Shuangyi Abu Ali
(74) *Attorney, Agent, or Firm* — Frommer Lawrence & Haug LLP

(57) ABSTRACT

A polycrystalline diamond (PCD) compact and method for making the compact are provided. The method includes bringing a first PCD wafer and a second PCD wafer together at an interface in the presence of a bonding agent to form an unbonded assembly and bonding the wafers together at the interface at a pressure and temperature at which diamond is thermodynamically stable. The first PCD wafer is more thermally stable than the second PCD wafer.

17 Claims, 1 Drawing Sheet

(51) Int. Cl.
*B22F 7/06* (2006.01)
*C04B 35/52* (2006.01)
*C04B 35/573* (2006.01)
*C04B 35/645* (2006.01)
*C04B 37/02* (2006.01)

(56) References Cited

U.S. PATENT DOCUMENTS

| | | |
|---|---|---|
| 4,944,772 A | 7/1990 | Cho |
| 5,127,923 A | 7/1992 | Bunting et al. |
| 6,443,248 B2 | 9/2002 | Yong et al. |
| 6,544,308 B2 | 4/2003 | Griffin et al. |
| 6,562,462 B2 | 5/2003 | Griffin et al. |
| 2002/0045059 A1 | 4/2002 | Griffin et al. |
| 2006/0266558 A1* | 11/2006 | Middlemiss et al. ......... 175/426 |
| 2008/0010905 A1 | 1/2008 | Eyre |
| 2008/0179109 A1 | 7/2008 | Belnap et al. |
| 2008/0302579 A1 | 12/2008 | Keshavan et al. |
| 2009/0071727 A1 | 3/2009 | Keshavan et al. |
| 2009/0173015 A1 | 7/2009 | Keshavan et al. |

FOREIGN PATENT DOCUMENTS

| | | |
|---|---|---|
| JP | 59-219500 A | 12/1984 |
| WO | WO 00/20149 A | 4/2000 |
| WO | WO 02/34437 A | 5/2002 |

* cited by examiner

CUTTING TOOL INSERT

This application is a 371 of PCT/IB2009/051479 filed on Apr. 8, 2009, published on Oct. 15, 2009 under publication number WO 2009/125355 A and claims priority benefits of South African Patent Application No. 2008/03078 filed Apr. 8, 2008, the disclosure of which is incorporated herein by reference.

BACKGROUND OF THE INVENTION

THIS invention relates to polycrystalline diamond compacts and more particularly to a method of manufacturing polycrystalline diamond compacts.

A commonly used cutting tool insert for drill bits is one which comprises a layer of polycrystalline diamond (PCD) bonded to a cemented carbide substrate. The layer of PCD presents a working face and a cutting edge around a portion of the periphery of the working surface. Polycrystalline diamond comprises a mass of diamond particles containing a substantial amount of direct diamond-to-diamond bonding.

U.S. Pat. No. 4,224,380 discloses a compact consisting essentially of self-bonded abrasive particles with an interconnected network of pores dispersed throughout. The compact is produced by bonding a mass of abrasive particles into a self-bonded body through the use of a sintering aid material under high pressures and temperatures (HP/HT). The body formed at HP/HT includes the self-bonded particles with the sintering aid material (e.g., cobalt or cobalt alloys) infiltrated throughout the body. The infiltrant is then removed, for example, by immersion of the body in an aqua regia bath. It has been discovered that the removal of substantially all of the infiltrant provides an abrasive particles compact which has substantially improved resistance to thermal degradation at high temperatures.

U.S. Pat. No. 4,944,772 discloses a process for fabricating a supported polycrystalline diamond or CBN compact in general, though such process is especially adapted to the fabrication of a thermally-supported polycrystalline diamond or CBN compact. The process comprises forming a sintered polycrystalline diamond or CBN compact having a surface and separately forming a cemented carbide support having a support surface. The compact and support then are mated at their respective surfaces with a layer of diamond or CBN crystals having the largest dimension of between about 30 and 500 micrometers interposed between said surfaces. Also, a source of diamond or CBN catalyst/sintering aid material is associated with the layer of diamond or CBN crystals. The mated compact and support then are subjected to HP/HT conditions and for a time adequate for converting said diamond or CBN crystals into a polycrystalline diamond or CBN compact and for producing a supported polycrystalline compact of at least two polycrystalline layers (i.e. bi-layer compact). Preferably, thermally-stable compacts are used in the process.

U.S. Pat. No. 5,127,923 discloses a highly consolidated abrasive compact which has enhanced particle-to-particle bonding, increased density and improved thermal stability performance characteristics and which can be bonded directly to a supporting substrate. The compact is produced by subjecting a mass of abrasive particles, e.g., diamond or cubic born nitride, to multiple pressure cycles at high temperatures. A solvent-catalyst sintering aid is employed in the initial pressure cycle. The compact then possesses residual interconnected porosity in the particle mass which is filled with the solvent-catalyst. Depending upon the degree of sintering, the solvent-catalyst can be removed by leaching or other suitable process. The removal of the solvent-catalyst permits further consolidation and sintering of the particle mass in subsequent pressure cycles. During the final pressure cycle, the abrasive mass can be bonded to a supporting substrate. In addition, a non-catalyst sintering aid, such as silicon, boron or metals rendered non-catalytic by the addition of silicon or boron which may form strong and chemically-resistant carbides, can be used in the second pressure cycle to enhance the sintering process and create a hard abrasive bonding matrix through out the particle mass.

Japan patent publication number JP 59219500 discloses chemical treatment of a working surface of a PCD element. This treatment dissolves and removes the catalyst/solvent matrix in an area immediately adjacent to the working surface. The invention is claimed to increase the thermal resistance of the PCD material in the region where the matrix has been removed without compromising the strength of the sintered diamond.

U.S. Pat. Nos. 6,544,308 and 6,562,462 disclose a PCD element having a body with a working surface. A first volume of the body remote from the working surface contains a catalyzing material, and a second volume of the body adjacent to the working surface is substantially free of the catalyzing material.

There is a need for polycrystalline diamond compacts having excellent thermal stability in use combined with high strength and fracture resistance, and a cost-effective method for making them.

SUMMARY OF THE INVENTION

According to the invention there is provided a method for making a polycrystalline diamond (PCD) compact, the method including providing a first PCD wafer; providing a second PCD wafer, the first PCD wafer being more thermally stable than the second PCD wafer, bringing the first and second PCD wafers together at an interface in the presence of a bonding agent to form an unbonded assembly; and bonding together the first and second PCD wafers at the interface at a pressure and temperature at which diamond is thermodynamically stable.

Both the first and second PCD wafers are in the form of pre-formed polycrystalline diamond bodies, produced by methods known in the art. The polycrystalline diamond compact which is produced has a layer or region of PCD which is more thermally stable than a second layer or region of PCD. The layers or regions are bonded along an interface.

The first and second PCD wafers have major surfaces on each of opposite sides thereof and the unbonded assembly is generally made by bringing together a major surface of one of the wafers and a major surface of the other wafer. The wafers are discrete and separate from each other prior to the bonding step.

Preferably the first PCD wafer is substantially free or devoid of solvent/catalyst for diamond. More preferably the first PCD element is at least partly porous.

The thickness of the first PCD wafer or of each first PCD wafer, if there is more than one, is preferably in the range from about 100 to 500 micrometers.

Preferably the bonding agent comprises a solvent/catalyst for diamond. More preferably the bonding agent is disposed in interstices within the second PCD wafer. Alternatively or additionally, bonding agent may be disposed on or proximate a surface of first PCD wafer a surface of the second PCD wafer, or surfaces of both the first and second PCD wafers.

The bonding agent must be present at the interface between the first and second PCD wafers at some stage during the step of bonding together the first and second PCD wafers.

The bonding agent may be provided in the form of a layer, and disposed intermediate the first and second PCD wafers. Such bonding agent may comprise a solvent/catalyst for diamond or a refractory metal capable of reacting with diamond to form a metal carbide, such as Mo, Nb, Ti, V, Cr, Zr, Hf, Ta or W.

The bonding step preferably results in direct diamond-to-diamond bonding between diamond in the first PCD wafer and diamond in the second PCD wafer.

When the first PCD wafer is porous, a thermally stable material or material that does not readily react with diamond, or a precursor material capable of reacting with diamond to form such a material, may be disposed proximate the upper surface of the first, at least porous PCD wafer within the unbonded assembly, with the purpose of melting and infiltrating into pores within the first PCD wafer during the bonding step. If, as is preferred, such material has lower melting point than solvent/catalyst for diamond, it will infiltrate the first PCD wafer before solvent/catalyst within the second PCD wafer melts and thus hinder or prevent the solvent/catalyst from infiltrating into the first PCD wafer. This preserves the thermal stability of the first PCD element.

Preferably the ultra-high pressure is in the range from 3 GPa to 7 GPa, more preferably the ultra-high pressure is in the range from 3 GPa to 5 GPa.

Preferably the temperature is at least 900 degrees centigrade, more preferably the temperature is at least 1,000 degrees centigrade.

Where the bonding agent comprises solvent/catalyst for diamond, the temperature is preferably such that the solvent/catalyst will dissolve diamond proximate or in the region of the interface and remain substantially solid, i.e. the solvent/catalyst will not substantially liquefy and infiltrate the first PCD wafer to any significant extent.

It is thus possible to use temperatures and pressures lower than would be required to produce a layer of PCD from a mass of diamond particles. Substantial savings in the cost of manufacture can be achieved.

According to a further aspect of the invention the polycrystalline diamond compact comprises a polycrystalline diamond (PCD) table having a working surface and a region of thermally stable polycrystalline diamond (TSPCD) adjacent the working surface.

In one preferred form of the invention, the PCD compact comprises a PCD table and a region of TSPCD wherein the region comprises a relatively small region of the entire PCD. Thus, in one form of the invention the thickness of the first PCD wafer does not exceed 1200 µm. The first layer typically has a minimum dimension of approximately 100 µm. This layer may be further accompanied by an additional region of PCD which is not thermally-stable i.e. it contains metallic catalyst/solvent phase.

The first PCD wafer will typically have a thickness and dimension such that in the abrasive element is the thermally stable region contributes no more than 60%, preferably less than 50% and most preferably less than 40% to the overall height or thickness of the PCD table.

The first PCD wafer will typically be made of thermally stable polycrystalline diamond which may be any known in the art. The thermally stable polycrystalline diamond will preferably be porous. The pores of the porous structure will generally be substantially empty, although the pores may contain a material which does not compromise the thermal stability of the layer. The thermally stable polycrystalline diamond may be made by various methods known in the art. Typically, the method will include a HPHT sintering step, but other methods such as chemical vapour deposition may be employed. The first PCD wafer, as produced, will typically have a maximum dimension of 1.5 mm. In the case of a sintering step, it may include the use of a carbide substrate to provide mechanical support and/or an infiltration source. The wafer is then thinned, typically using mechanical means, to provide a maximum thickness of between approximately 1200 and 250 µm. The catalyst/solvent binder is then removed from the wafer using various known leaching technologies.

The second PCD wafer is typically made of polycrystalline diamond comprising a bonding phase containing catalyst/solvent. The second PCD wafer may be made by methods known in the art. The catalyst/solvent will typically be cobalt, iron or nickel or an alloy containing such a metal.

The diamond content of the PCD, whether first or second PCD wafer, is preferably greater than 80 volume %.

The second PCD wafer may be bonded to a cemented carbide substrate. Alternatively, if the second PCD wafer is free standing, a body of cemented carbide may be brought into contact with a surface of the second PCD wafer in the unbonded assembly. Bonding of the second PCD wafer to the cemented carbide substrate will occur during the bonding step.

During the bonding step, the thermally stable nature of the first PCD wafer can be preserved by using lower temperatures at which the catalyst/solvent remains essentially solid. Various other means such as passivation, co-infiltration, or infiltration control can be used; or if re-infiltration occurs, then the metallic infiltrant can be removed or altered in a subsequent leaching or treatment step.

By "working surface" of the PCD cutting element is meant that surface which is usefully employed in the operation of the cutter i.e. this will typically include the top surface as well as the peripheral edge portion, generally the top surface of the more thermally stable PCD region.

In one form of this invention a plurality of discrete layers or wafers of PCD are bonded to one another, to form the resultant PCD table which is bonded to a substrate, particularly a cemented carbide substrate. An infiltrant, which could be a conventional solvent/catalyst, may be included between some or all of respective layers or wafers, or the stack of wafers and the substrate, or a combination of these, to allow for re-infiltration of an appropriate infiltrant during the synthesis process. In one version of this form of this invention, the discrete layers of PCD have generally the same composition, such that the PCD table has generally the same composition as the individual layers or wafers. In an alternative form of the invention, the individual PCD layers or wafers have different compositions to form, for instance, a PCD table with a composition gradient running through its thickness.

An advantage of stacking relatively thin porous, thermally stable PCD elements rather than providing a single relatively thicker one arises from the fact that removal of solvent/catalyst binder from the PCD element is an extremely difficult and time-consuming step. This step is necessary since PCD elements typically include solvent/catalyst material within interstices within the PCD structure as a consequence of the manufacture of sintered diamond bodies. The thicker the PCD element, the more time-consuming and costly is the step of solvent/catalyst removal, which step typically involves treating the element in an acid liquor for several weeks. In addition, the lower the average size of the diamond grains within a PCD element, which may be required for improved wear resistance of the PCD element, the longer the treatment step takes. The method overcomes this problem by providing thinner PCD elements, which require much less time to treat, and stacking them.

The invention provides, according to yet another aspect of the invention, a polycrystalline diamond compact comprising a first layer of polycrystalline diamond bonded to a second layer of polycrystalline diamond, the first layer of polycrystalline diamond being more thermally stable and thinner than the second layer of polycrystalline diamond.

Preferably the thickness of the first layer of polycrystalline diamond is in the range 100 to 500 microns.

The first layer of polycrystalline diamond preferably comprises thermally stable polycrystalline diamond, as described above.

The second layer of polycrystalline diamond is preferably polycrystalline diamond containing a bonding phase comprising a diamond solvent/catalyst, as described above.

Bonding between the two layers of the polycrystalline diamond compact is preferably direct diamond-to-diamond bonding.

A PCD compact according to the invention and as produced by the method of the invention is suitable for use in tools for cutting, machining, boring, drilling or degrading bodies comprising hard or abrasive materials, such as rock, concrete, asphalt, ceramic, metal, composites or wood. The PCD compact is particularly suited to applications in which a working edge of the tool reaches elevated temperatures in use, particularly the drilling or boring of rock formations, as may be carried out in the oil and gas drilling industry. The PCD compact is preferably bonded to a hard-metal substrate, preferably a cobalt-cemented tungsten carbide substrate, the more thermally stable first PCD layer being disposed remotely from the substrate, with a second, less thermally stable PCD layer being disposed intermediate the first PCD layer and the substrate. The first PCD layer thus provides a relatively thermally stable working surface and working edge for engaging the body or workpiece and improving the overall resilience of the compact against heating in use. The second PCD layer is preferably more fracture resistant and stronger than the first PCD layer, and thus provides robust support for it in use. Interstices within the second PCD layer are preferably at least partly filled with a metal or metal alloy, more preferably a metal or metal alloy comprising a solvent/catalyst for diamond.

An advantage of the method of the invention is that the properties of the first and second PCD wafers can be separately pre-determined, since they are both manufactured separately prior to being combined. This means that they can be combined without substantial infiltration of material from one PCD wafer into the other. In particular, if the second PCD wafer contains a solvent/catalyst for diamond, it would generally be undesirable for this material to infiltrate into pores within the first PCD wafer, when such wafer is porous, since the presence of solvent/catalyst would substantially reduce its thermal stability. The degree to which solvent/catalyst would liquefy can be controlled by means of the temperature used during the bonding step. Preferably, the temperature would be close enough to the melting point of the solvent/catalyst material for it to have a solvent/catalyst function locally proximate the bonding interface, but not for substantial melting to occur and consequently for molten solvent/catalyst material to infiltrate into pores within the first PCD wafer. The temperatures used for the bonding step may therefore be substantially lower than those that are needed to sinter bulk PCD, a process that typically requires molten solvent/catalyst to infiltrate from a hard-metal substrate containing solvent/catalyst material as a binder. Consequently, a lower pressure could be used during the bonding step while maintaining a condition wherein diamond is thermodynamically stable, which is necessary in order to avoid conversion of diamond into graphite in the presence of a solvent/catalyst for diamond at a high temperature.

Another advantage of the invention is that the first PCD wafer may be relatively thin without risk of fracture during the bonding step. If the second PCD wafer was sintered during the bonding step rather than in a separate sintering step, the first PCD wafer would need to be contacted with an agglomerated mass of diamond particles during the application of pressure, before the agglomerated mass had sintered to form a strong, inter-grown PCD support. This could result in the fracture of the first PCD wafer during the bonding step. By preparing the second PCD wafer prior to contacting it with the first PCD wafer, this problem is avoided since both the second PCD wafer functions as a rigid, stiff support for the first PCD wafer during this step, which is especially important if the first PCD wafer is relatively thin.

A further advantage of the invention is that the pre-sintering of the first and second PCD wafers prior to the bonding step is believed to reduce the development of internal stresses within the PCD compact that arise from combining the sintering and combining steps where the properties, especially the thermal properties of the first and second PCD wafers are substantially different.

A further advantage of the invention is that the filler material within interstices within the second PCD wafer may be selected independently from the binder of substrate, since these components are pre-sintered prior to the bonding step.

Yet a further advantage of the invention is that the first PCD wafer may be treated independently from the substrate and the second PCD wafer to render it thermally stable. This treatment typically includes a step of immersing the element in acid for an extended period of time in order to leach out solvent/catalyst material from within interstices within it. If this step is carried out once the first PCD element is bonded to the second PCD wafer, which may be bonded to a hard-metal substrate, the latter components need to be masked by some means to prevent them from being attacked by the acid. This masking process is not technically trivial and limits the types of leaching treatments which can be employed without causing significant damage to the portions of the cutter which must be protected. By treating the first PCD wafer prior to bonding, this problem is avoided.

BRIEF DESCRIPTION OF THE DRAWINGS

Non-limiting preferred embodiments will now be described in more detail, by way of example only, with reference to the drawings FIGS. 1 and 2, which show schematic diagrams of cross sections of two embodiments of unbonded assemblies.

DESCRIPTION OF PREFERRED EMBODIMENTS

Figure 1:
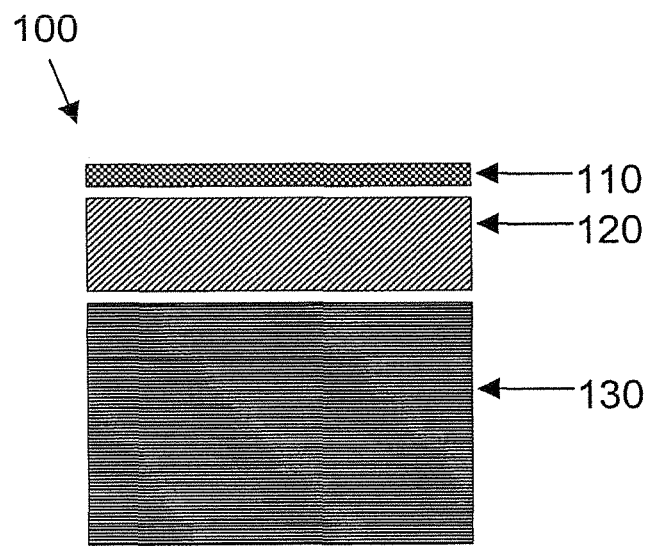

In a preferred embodiment of the method described with reference to FIG. 1, an unbonded assembly, 100, comprising a thermally stable first PCD element (wafer in shape), 110, a less thermally stable second PCD element (wafer in shape), 120, and a hard-metal substrate, 130, is provided. The first PCD element is disposed remote from the substrate, and the second PCD element is disposed intermediate the first PCD element and the substrate. The first PCD element is substantially free or devoid of catalyst/solvent for diamond and the second PCD element contains a solvent/catalyst for diamond within internal interstices. The PCD elements and the substrate are contacted and assembled into a capsule for use in an ultra-high pressure furnace, as is well known in the art, and the assembly is subjected to a pressure and temperature at which diamond is thermodynamically stable. In a version of the embodiment in which the solvent/catalyst is cobalt, the pressure is about 5.5 GPa and the temperature is about 1,400 degrees centigrade. In another version of the embodiment the pressure is 4.5 GPa and the temperature is about 1,200 degrees centigrade.

Figure 2:
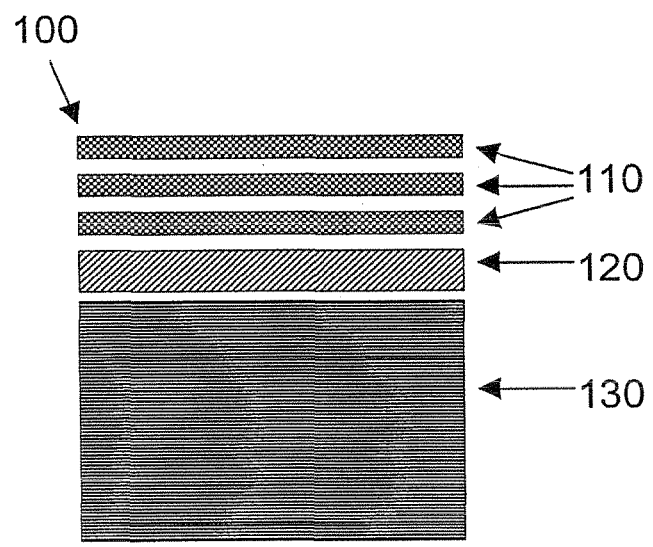

In a preferred embodiment of the method described with reference to FIG. 2, an unbonded assembly, 100, comprising more than one thermally stable PCD element, 110, each of which is referred to in this case as a first PCD element, a less thermally stable second PCD element, 120, and a hard-metal substrate, 130, is provided. The first PCD elements are disposed proximate each other and remote from the substrate, and the second PCD element is disposed intermediate the first PCD elements and the substrate. The first PCD elements are substantially devoid of catalyst/solvent for diamond and the second PCD element contains a solvent/catalyst for diamond within internal interstices. The PCD elements and the substrate are contacted and assembled into a capsule for use in an ultra-high pressure furnace, as is well known in the art, and the assembly is subjected to a pressure and temperature at which diamond is thermodynamically stable. In a version of the embodiment in which the solvent/catalyst is cobalt, the pressure is about 5.5 GPa and the temperature is about 1,400 degrees centigrade.

The drawings do not show additional shims or sources of infiltrant which may be included in order to facilitate the bonding of the PCD elements. These may be inserted at interfaces between elements.

The PCD elements, 110 and 120, are produced using an ultra-high pressure and temperature sintering method, in which unbonded diamonds are sintered together at a pressure typically in the range from about 5 GPa to about 8 GPa at a temperature typically in the range from about 1,300 degrees centigrade to about 1,700 degrees centigrade in the presence of a solvent/catalyst for diamond, or by means of chemical vapour deposition (CVD). Both methods are well known in the art. The PCD element may be sliced from a thicker PCD element by means of electro-discharge machining or a similar method. The element typically has a diameter consistent with the final desired diameter of the abrasive element. The thickness of a first PCD element, 110, may be reduced if necessary by means of lapping or slicing (for example using EDM), to provide a maximum thickness of approximately 1200 micrometers. This is the maximum thickness of PCD that is preferred for being subject to treatment to remove substantially all solvent/catalyst contained within the element by means of leaching in acid. Various methods for removing solvent/catalyst are known in the art, the most common being immersion of the PCD element into an acid bath for several days or weeks. Other known methods include electrolytic etching and evaporation techniques.

In an embodiment in which a second PCD element is bonded to a cobalt-cemented carbide substrate, the portion of the second PCD element adjacent the carbide substrate should have a grain size that is less than 50 micrometers. Several PCD elements may be stacked such that their respective average diamond particle sizes are graded relative to one another and to the uppermost first PCD element, this grading being within the range from about 0.1 to 30 micrometers. Preferably, the intermediate layers have an average diamond grain size less than 30 microns.

During the step of bonding together the PCD wafers and the substrate, solvent/catalyst material that may be present in the first layer or the substrate may re-infiltrate voids or pores in the first PCD wafer, when porous. This can have a detrimental effect on the thermal stability of the working surface layer. Re-infiltration can be minimised if as low as possible temperature is used while still achieving direct diamond-to-diamond bonding between the PCD wafers. There are several other approaches to controlling or minimising this effect.

The first approach is to control the progress of the infiltrant front as it sweeps upwards into the wafer(s) region; such that it does not significantly contact the uppermost portions of the first PCD wafer or wafers. This can be achieved by control of the temperature and pressure over time during the bonding step, as would be appreciated by the person skilled in the art.

A second approach is partially to fill pores within in the first PCD wafer adjacent the working surface to a desired depth with a passivation compound or material which effectively hinders or halts the infiltrant front during the reattachment process.

A third approach is to co-infiltrate the porous first layer, typically from the top surface, with an alternative molten infiltrant material during the reattachment or bonding step. A material that has a lower melting point than infiltrant sourced from the substrate is preferred in order to fill the pores before the substrate infiltrant penetrates from below. However, it can be desirable to achieve simultaneous infiltration from the top and bottom of the element or elements. For example, using a similar process to that described in U.S. Pat. No. 5,127,923, the first PCD layer or layers may be infiltrated with molten silicon or a silicon-based compound, resulting in the reactive formation of silicon carbide within pores as the infiltrant comes into contact with the diamond network. Other molten infiltrants which are suitable include metals such as aluminium, magnesium, lead and other similar metals or alloys containing these metals.

Example 1

A free-standing first PCD disc comprising bonded diamond grains having a multimodal size distribution and an average grain size of about 12 micrometers was prepared by conventional means using ultra-high pressure and temperature and infiltrated cobalt as solvent/catalyst sintering aid. The PCD disc was sintered in contact with a cobalt-cemented tungsten carbide substrate, which provided the source of cobalt for sintering the PCD and to which the PCD became integrally bonded during the sintering step. The substrate was removed by grinding it away, leaving a free-standing PCD disc. The disc was 17.4 millimeters in diameter and had a height of about 400 micrometers. The disc was immersed in a mixture of hydrofluoric and nitric acid for more than 96 hours to remove substantially all of the cobalt from within interstices within it, leaving the disc porous, i.e. a polycrystalline diamond with pores or voids within the polycrystalline structure.

A second PCD disc, having the same composition as the first disc, was manufactured in the same way as the first disc, but this time the substrate was not removed. The second PCD disc had a thickness of 1 millimeter, and both the PCD and the substrate had a diameter of 17.4 millimeters. The combined height of the PCD and substrate was 13 millimeters.

The first, leached PCD disc was placed onto the top surface of the second PCD disc, and a silicon disc having diameter of 17.4 millimeters was placed onto the upper surface of the first PCD disc to form an unbonded assembly. The unbonded assembly therefore comprised a first, thermally stable PCD disc remote from a substrate, with a second, much less thermally stable PCD disc intermediate the first PCD disc and the substrate, and integrally bonded to the substrate, and a silicon disc on top of the first PCD disc. The unbonded assembly was encapsulated within a jacket comprising a refractory metal cup, as is known in the art, and assembled into a capsule used for sintering PCD in a conventional ultra-high pressure apparatus. The purpose of the silicon was to infiltrate into the upper porous PCD layer before the cobalt melted, and to react with the diamond to form silicon carbide, which is thermally stable. Once formed, the silicon carbide would prevent substantial infiltration of cobalt from the second, intermediate PCD disc into the first, upper PCD disc, which it was intended should remain thermally stable. The assembly was subjected to an ultra-high pressure of about 5.5 GPa and a temperature of about 1,400 degrees centigrade for about five minutes to yield a PCD compact.

The PCD compact comprised an upper region of thermally stable PCD, comprising silicon carbide within internal interstices or pores of an inter-bonded network of sintered diamond grains bonded to a PCD region comprising cobalt within the interstices. The bonding at the interface between these two PCD regions was in the form of direct diamond-to-diamond bonding between diamond in the first, upper layer and that of the second, lower layer.

Example 2

A free-standing first, leached PCD disc and a second, unleached PCD disc bonded to a substrate were prepared as in example 1.

A with niobium wafer having diameter of 17.4 millimeters was placed on onto the top surface of the second PCD disc, and the first, leached PCD disc was placed onto the niobium wafer, in effect sandwiching the niobium wafer between the first and second PCD discs. A copper disc having diameter of 17.4 millimeters was placed onto the upper surface of the first PCD disc to form an unbonded assembly. The unbonded assembly therefore comprised a first, thermally stable PCD disc remote from a substrate, with a second, much less thermally stable PCD disc intermediate the first PCD disc and the substrate, and integrally bonded to the substrate, a niobium wafer intermediate the first and second PCD discs, and a copper disc on top of the first PCD disc. The unbonded assembly was encapsulated within a jacket comprising a refractory metal cup, as is known in the art, and assembled into a capsule used for sintering PCD in a conventional ultra-high pressure apparatus. The purpose of the copper was to infiltrate into the upper porous PCD layer before the cobalt melted, and thus to prevent substantial infiltration of cobalt from the second, intermediate PCD disc into the first, upper PCD disc, which it was intended should remain thermally stable. Copper does not react readily with diamond and therefore does not compromise the thermal stability of PCD. The assembly was subjected to an ultra-high pressure of about 5.5 GPa and a temperature of about 1,200 degrees centigrade for about five minutes to yield a PCD compact. The temperature was selected to be higher than the melting point of copper, but lower than that of cobalt.

The PCD compact comprised an upper region of thermally stable PCD, comprising copper within internal interstices of an inter-bonded network of sintered diamond grains bonded to a PCD region comprising cobalt within the interstices.

Example 3

A free-standing first, leached PCD disc and a second, unleached PCD disc bonded to a substrate were prepared as in example 1.

The first, leached PCD disc was placed onto the top surface of the second PCD disc to form an unbonded assembly. The unbonded assembly was encapsulated within a jacket comprising a refractory metal cup, as is known in the art, and assembled into a capsule used for sintering PCD in a conventional ultra-high pressure furnace. The assembly was subjected to an ultra-high pressure of about 5.5 GPa and a temperature of about 1,250 degrees centigrade for about ten minutes to yield a PCD compact. The temperature was selected to be as close as practically possible to the melting point of cobalt, without substantial cobalt melting occurring.

The PCD compact comprised an upper region of thermally stable, substantially porous PCD bonded to a lower PCD region comprising cobalt within the interstices. Direct diamond-to-diamond bonding between diamond in the first, upper layer and that of the second, lower layer was evident, and the first PCD layer was substantially free of cobalt.

The invention claimed is:

1. A method for making a polycrystalline diamond (PCD) compact wherein the polycrystalline diamond compact produced comprises a polycrystalline diamond table having a working surface and a region of thermally stable polycrystalline diamond (TSPCD) adjacent the working surface, the method including:
   providing a first PCD wafer, the first PCD wafer being porous;
   providing a second PCD wafer, the first PCD wafer being more thermally stable than the second PCD wafer and having a thickness that does not exceed 1200 microns the first PCD wafer being adjacent the working surface;
   bringing the first and second PCD wafers together at an interface in the presence of a bonding agent to form an unbonded assembly; and
   bonding together the first and second PCD wafers at the interface at a pressure and temperature at which diamond is thermodynamically stable, the bonding step including infiltrating the first PCD wafer from the working surface with an infiltrant material to hinder or halt solvent/catalyst in the second PCD wafer and/or substrate from infiltrating into the first PCD wafer;
   wherein the infiltrant material has a lower melting point than solvent/catalyst for diamond.

2. A method according to claim 1 wherein the first PCD wafer is substantially free of solvent/catalyst for diamond.

3. A method according to claim 1 wherein the bonding agent comprises a solvent/catalyst for diamond.

4. A method according to claim 1 wherein the bonding agent is provided in the form of a layer, and disposed between the first and second PCD wafers.

5. A method according to claim 1 wherein the bonding agent is present in the second PCD wafer.

6. A method according to claim 1 wherein the pressure during the bonding step is in the range from 3 GPa to 5 GPa.

7. A method according to claim 3 wherein the temperature is such that the solvent/catalyst dissolves diamond, and remains substantially solid.

8. A method according to claim 1 wherein the thickness of the first PCD wafer is 100 micrometers to 500 micrometers.

9. A method according to claim 1 wherein the dimensions of the first PCD wafer are such that the region of TSPCD in the polycrystalline diamond compact is no more than 60% of the height of the PCD table.

10. A method according to claim 1 wherein the dimensions of the first PCD wafer are such that the region of TSPCD in the polycrystalline diamond compact is less than 50% of the height of the PCD table.

11. A method according to claim 1 wherein the dimensions of the first PCD wafer are such that the region of TSPCD in the polycrystalline diamond compact is less than 40% of the height of the PCD table.

12. A method according to claim wherein the second PCD wafer is bonded to a cemented carbide substrate.

13. A method according to claim 1 wherein the second PCD wafer is free standing, a body of cemented carbide is brought into contact with a surface of the second PCD wafer in the unbonded assembly and bonding of the second PCD wafer to the first PCD wafer occurs during the bonding step.

14. A method according to claim 1 wherein the bonding step results in direct diamond-to-diamond bonding between the first and second PCD wafers.

15. The method of claim 1, wherein during the bonding step the infiltrant material melts and infiltrates into pores in the porous first PCD wafer.

16. The method of claim 1, wherein the infiltrant material is selected from the group consisting of (a thermally stable material, a material that does not readily react with diamond, and a precursor material capable of reacting with diamond).

17. The method of claim 1, wherein the infiltrant material comprises a passivation compound.

* * * * *